US006618813B1

(12) United States Patent
Hsu et al.

(10) Patent No.: US 6,618,813 B1
(45) Date of Patent: Sep. 9, 2003

(54) METHOD FOR SUSPENDING, RESUMING, AND TURNING ON A COMPUTER SYSTEM WITHOUT BEING AFFECTED BY AN ABNORMAL POWER FAILURE

(75) Inventors: Hsien-Yueh Hsu, Taipei (TW); Long-Loon Shiu, Chang-Hua Hsien (TW)

(73) Assignee: Asustek Computrt Inc., Taipei (TW)

( * ) Notice: Subject to any disclaimer, the term of this patent is extended or adjusted under 35 U.S.C. 154(b) by 0 days.

(21) Appl. No.: 09/350,219

(22) Filed: Jul. 9, 1999

(30) Foreign Application Priority Data

Aug. 26, 1998 (TW) .......................................... 87114055 A

(51) Int. Cl.[7] .............................................. G06F 1/26
(52) U.S. Cl. ...................................... 713/323; 713/310
(58) Field of Search ................................ 713/300, 310, 713/320, 322, 323, 324, 340; 714/14, 24, 22

(56) References Cited

U.S. PATENT DOCUMENTS 5,765,001 A * 6/1998 Clark et al. ................. 713/340
5,889,933 A * 3/1999 Smith ........................... 714/22
6,052,793 A * 4/2000 Mermelstein ................ 713/340
6,272,630 B1 * 8/2001 Chen et al. ..................... 713/2
6,324,651 B2 * 11/2001 Kubik et al. ................ 713/323
6,389,556 B1 * 5/2002 Qureshi ....................... 714/15
6,408,397 B1 * 6/2002 Alexander et al. .......... 713/340

* cited by examiner

*Primary Examiner*—Sumati Lefkowitz
*Assistant Examiner*—X. Chung-Trans
(74) *Attorney, Agent, or Firm*—Rabin & Berdo, P.C.

(57) ABSTRACT

A method for suspending and resuming a computer system without being affected by an abnormal power failure. The relevant operating information and context of the related devices are stored in both a memory and a hard disk before the computer system enters into a sleep state. If a power failure occurs, relevant operating information of the system can still be fetched from the hard disk to restore the computer system to its original operating state even though the information saved in the memory is lost. Also, the computer system can self turn on and activate a "wake on LAN" function and a "ring in wake up" function when power resumes after a sudden power failure before entering into the soft-off state. Therefore, users and system administrator can wake up the computer system from a remote site in a very convenient way.

13 Claims, 5 Drawing Sheets

METHOD FOR SUSPENDING, RESUMING, AND TURNING ON A COMPUTER SYSTEM WITHOUT BEING AFFECTED BY AN ABNORMAL POWER FAILURE

CROSS-REFERENCE TO RELATED APPLICATION

This application claims the priority benefit of Taiwan application serial no. 87114055, filed Aug. 26, 1998, the full disclosure of which is incorporated herein by reference.

BACKGROUND OF THE INVENTION

1. Field of Invention

The present invention generally relates to a power management method for a computer system, and more particularly to a method for suspending, resuming, and turning on a computer system without being affected by an abnormal power failure.

2. Description of Related Art

With the advancement of information technology, computers play an important role in the day-to-day life in this modern society. FIG. 1 shows a block diagram of a conventional computer system 100, which comprises a central processing unit (CPU) 110, a chipset 120, a memory 130, a storage device 140, an interface device 160, and a power supply 150. The CPU 110 is the heart of the computer system 100, responsible for executing programs in the computer system 100. The chipset 120 is used to control the communication between other devices within the computer system 100 and the CPU 110. The memory 130, typically dynamic random access memory (DRAM) because of its high speed and low cost, is used for storing programs and data for the computer system 100. The storage device 140 generally has a large capacity for storing data in a longer period, such as a hard disk drive or a compact disc drive, etc. The interface device 160 connected to other peripheral devices is used as an interface for users to access the computer system 100, including keyboard, mouse, or printer interface, etc. As shown in FIG. 1, the interface device 160 including a MODEM 161 connected to a telephone line and a network adapter 162 connected to a network is depicted. The power supply 150 is used to convert an external AC power source into DC voltages, for example, +5V, −5V, +12V, or −12V, etc, required by various circuits within the computer system 100. For a power supply complying with the newly developed ATX specifications, the output from the power supply comprises a main power and a standby power. When the computer system 100 is in normal operation, the main power provides power for the whole computer system 100. When the computer system 100 is turned off, the standby power provides power required by some special devices to perform special functions, for example, remote wakeup, keyboard wakeup, or the sleep-state functions which will be described in details hereinafter.

With the advancement in hardware and software of a computer system, an advanced configuration and power interface (ACPI) specification has been developed to provide more functions in power management for the computer system. There are 5 different levels of sleep states, i.e., S1~S5, defined in the ACPI specification. The S1 and S2 sleep states are also called "power on suspend", which means the main power is still provided by the power supply although the system is in a suspending state. The S3 sleep state is called "suspend to RAM (STR)", which means relevant operating information and context of related devices are saved in a memory before the main power is turned off. Nevertheless, the standby power still provides power to the memory and its related circuits, so that relevant operating information and context of related devices can be saved in the memory. The S4 sleep state is called "suspend to disk (STD)", which means relevant operating information and context of related devices are saved in a hard disk before the main power is turned off. There is no need for the standby power to provide power to the memory and its related circuits. The S5 sleep state generally refers to a "soft off" state for the computer system.

Reference is now made to FIG. 2, where a flow chart showing a conventional computer system entering into a sleep state or soft-off state is depicted. FIG. 3 is a flow chart showing a conventional computer system resuming to a normal operation state from a sleep state or soft-off state. As shown in FIG. 2, when a suspending or soft-off instruction is received, the computer system determines the instruction category first (Step 21). If a STR instruction is received, relevant operating information and context of related devices are saved into a memory (Step 22). The computer system enters into the S3 sleep state (Step 23) by turning off the main power, while maintaining the standby power to provide power to the memory and its related circuits to save relevant operating information in the memory. If a STD instruction is received in Step 21, relevant operating information and context of related devices are saved into a hard disk (Step 24). The computer system enters into the S4 sleep state (Step 25) by turning off the main power. If a soft-off instruction is received in Step 21, a normal turn-off procedure is performed to close all the application programs. The computer system then enters into the soft-off state (Step 27).

Reference is now made to FIG. 3, where a flow chart of a conventional computer system resuming to a normal operation state from a sleep state or soft-off state is depicted. As shown in FIG. 3, when a wake-up instruction, for example, a resuming or turn-on instruction, is received, the computer system checks up the current system state first (Step 31). If the computer system is in the S3 or STR sleep state, a STR resuming procedure is performed (Step 32). That is, relevant operating information and context of related devices saved in the memory are restored to resume the system to its original operating state. Subsequently, the computer system enters the normal operation state (Step 33). If the computer system is found in the S4 or STD sleep state in Step 31, a STD resuming procedure is performed (Step 34) so that relevant operating information and context of related devices saved in a hard disk are restored to resume the system to its original state. Subsequently, the computer system enters the normal operation state (Step 33). If the computer system is found in the soft-off state in Step 31, a normal turn-on procedure is performed (Step 36). The computer system enters the normal operation state (Step 33).

When the computer system is in the S3 or STR sleep state, the computer system can resume to its original operating state in a few seconds. Furthermore, only a portion of the power source, typically less than 5W, is required for the memory and its related circuits to store relevant operating information in the memory while in S3 state. Compared with a power consumption of 60W~70W in the normal operation state, the S3 sleep state possesses a significant advantage. As for the S4 or STD sleep state where relevant operating information are stored in the hard disk, the time frame required is much longer for the system to resume to its original operating state, because a larger accessing time to the hard disk is required. It is therefore apparent that the S3 is an ideal choice as the sleep state because the computer system not only consumes less power, but also meets requirements of the "on-now system".

However, there is a risk if the computer system is in the S3 or STR sleep state. That is, if the external power source is suddenly cut off, the standby power is also cut off. The relevant operating information and context of related devices saved in the memory will be totally lost. The computer system can no longer resumes to its original operating state under this circumstance. The loss of saved data in the memory also causes significant damages to the users.

As mentioned earlier, the power supply provides a main power and a standby power to the computer system. When the main power is turned off, the standby power still provides power to several special devices to perform specific functions. For example, "wake on local area network (LAN)" or "ring in wake up" functions to turn on the computer system, in addition to the S3 sleep state function mentioned earlier, are some of the examples which require the standby power. The "wake on LAN" function is used to wake up a local computer system from a remote computer via a network. The "ring in wake up" function is used to wake up a computer system having a MODEM connected to a telephone line when a telephone rings. For computer systems having a MODEM 161 or a network adapter 162 as shown in FIG. 1, the objective to turn on the computer system mentioned earlier can be achieved. However, these special turn-on functions are closely related to status registers within the chipset generally including North bridge and South bridge of the computer system, which store relevant information for these functions. These special turn-on functions can only be activated if the computer system is turned off in a normal way. If there is any sudden power failure, these special turn-on functions can not be activated. Therefore, the computer system can not be turned on if power resumes after a sudden power failure. This causes inconvenience for users as well as system administrators to manage the computer system.

As a summary, the power management in a conventional computer system has the following disadvantages:

1. According to the ACPI specification, when the computer system is in the S3 sleep state where relevant operating information of the computer system are saved in the memory, the main power can be turned off while the standby power provides power required by the memory and its related circuits. In this case, the power consumption is significantly reduced. If the computer system is to be used, it can be quickly resumed to the original operating state, which is very convenient. However, if there is any abnormal power failure, the information stored in the memory will be lost and damages will be unavoidable for the users.
2. Although computer systems complying with the ATX specifications can support the "wake on LAN" function and the "ring in wake up" function, these functions are activated only when the computer system is turned off in a normal way. If there is any abnormal power failure, the turn-on functions can no longer be used. Therefore, the users or system administrator can not wake up a local computer system from a remote site or wake up a remote computer system from a local site when power resumes once the abnormal power failure had occurred, which causes great inconvenience.

SUMMARY OF THE INVENTION

It is therefore an objective of the present invention to provide a method for suspending and resuming a computer system without being affected by an abnormal power failure. Relevant operating information and context of the related devices are stored in both a memory and a hard disk before the computer system enters the S3 sleep state. If there is any power failure occurred, relevant operating information of the system can still be fetched from the hard disk so that the computer system can resume to its original operating state even if the information saved in the memory is lost.

It is another objective of the present invention to provide a method for turning on a computer system without being affected by an abnormal power failure, with which the computer system can self turn on and activate special turn-on functions when power resumes after a sudden power failure. Subsequently, the computer system enters the soft-off state. Users and system administrator can wake up the computer system from a remote side by the "wake on LAN" function or the "ring in wake up" function.

In accordance with the foregoing and other objectives of the present invention, a method for suspending a computer system without being affected by an abnormal power failure is provided. An instruction is received. The instruction is categorized. A normal turn-off procedure is performed so that the computer system enters into a soft-off state if a soft-off instruction is received. Relevant operating information and context of related devices are saved into both a memory and a hard disk in the computer system if the instruction received is determined to be either a STR or STD instruction. The instruction is re-categorized. The computer system enters into an S3 sleep state if the instruction received is a STR instruction. The computer system enters into an S4 sleep state if the instruction received is a STD instruction.

Accordingly, the method for resuming a computer system comprises the following steps. A wake up instruction is received, wherein the wake up instruction comprises a resuming instruction and a turn-on instruction. A current state of the computer system is determined. A normal turn-on procedure is performed to enter the computer system into a normal operation state if the current state of the computer system is neither in the STR sleep state nor in the STD sleep state. A STD resuming procedure is performed by restoring the relevant operating information and context of related devices from a hard disk to enter the computer system into a normal operation state if the computer system is in the STD sleep state. Whether there is any abnormal power failure occurred if the computer system is in the STR sleep state is determined. The STD resuming procedure is performed by restoring relevant operating information and context of related devices from the hard disk to enter the computer system into a normal operation state if the computer system is in the STR sleep state and an abnormal power failure had occurred. A STR resuming procedure is performed by restoring relevant operating information and context of related devices from a memory to enter the computer system into a normal operation state if the computer system is in the STR sleep state and no abnormal power failure had occurred.

In addition, the method for turning on a computer system without being affected by an abnormal power failure is provided. First, there is a register to memorize if an AC power failure happened. Secondly, there is an "AC power failure restart" option in the basic input and output system (BIOS) setup menu that users can select to restart the system or keep the previous state after power resumes if an AC power failure had happened. Thirdly, the system will turn itself on when power resumes after the AC power failure. The whole procedure is as follows:

When the system turns on (no matter by itself or by the users), it will check the register if an AC power failure happened. If there is no AC power failure happened, the system will boot directly to the operating system (OS) according to a normal booting sequence.

If an AC power failure did happen, it will first check the "AC power failure restart" option in the BIOS setup menu. If the information saved in the register is "restart" or "keep the previous status" and the previous status is "ON", the system will boot directly to the OS. If the information saved in the register is "no restart required" or "keep the previous status" and the previous status is "OFF", the system will activate the "Wake on LAN" and "Ring in wake up" functions in the chipset and related devices to enter the system into the soft off state.

Based on the above-mentioned procedures, the method for resuming and turning on a computer system comprises the following steps. A wake up instruction is received, wherein the wake up instruction comprises a resuming instruction and a turn-on instruction. Whether there is any abnormal power failure happened is determined. A "wake on LAN" function and a "ring in wake up" function are activated if there is an abnormal power failure happened to computer system. The current state of the computer system is determined. The current state of the computer system into a STD sleep state is changed while the computer system is in the STR sleep state and an abnormal power failure had occurred. The computer system is entering into the STD sleep state. The computer system is entering into the STD sleep state if the computer system is in the STD sleep state and an abnormal power failure had occurred. The computer system is entering into a soft-off state if the computer system is neither in the STR sleep state nor in the STD sleep state and an abnormal power failure had occurred. The current state of the computer system is determined if no abnormal power failure happened to computer system. A STR resuming procedure is performed if the computer system is in the STR sleep state and no abnormal power failure happened to computer system. A STD resuming procedure is performed if the computer system is in the STD sleep state and no abnormal power failure happened to computer system. A normal turn-on procedure is performed if the computer system is in the soft-off state and no abnormal power failure happened to computer system. The computer system is entering into a normal operation state.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
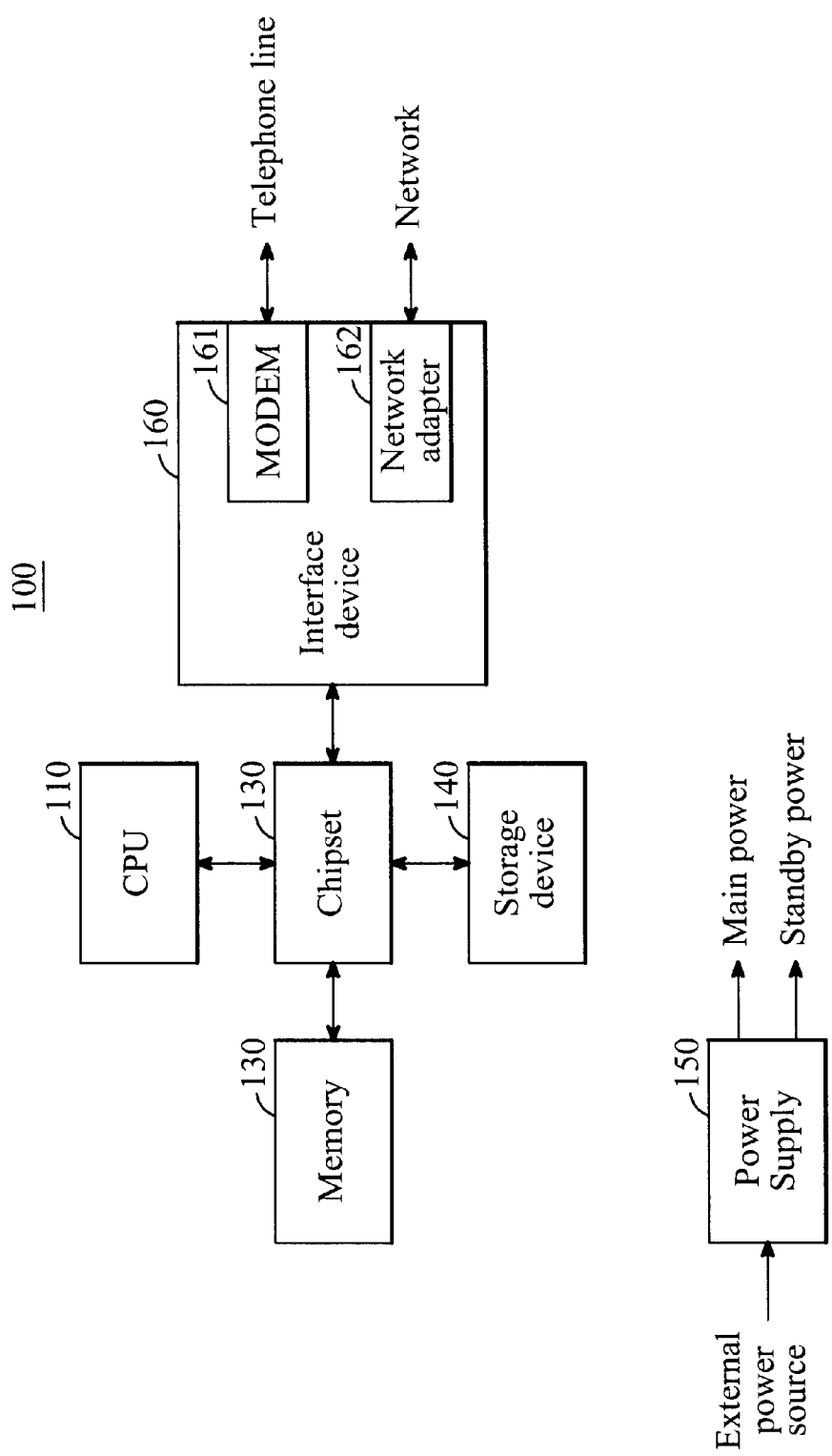
FIG. 1 is a block diagram of a conventional computer system.
Figure 2:
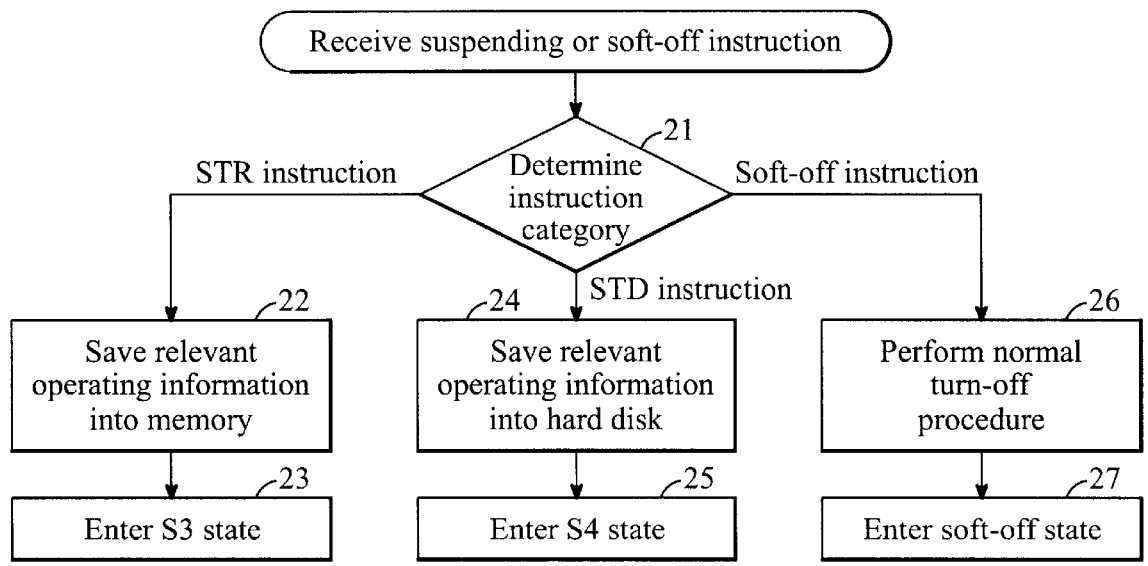
FIG. 2 is a flow chart showing a conventional computer system entering into a sleep state or soft-off state.
Figure 3:
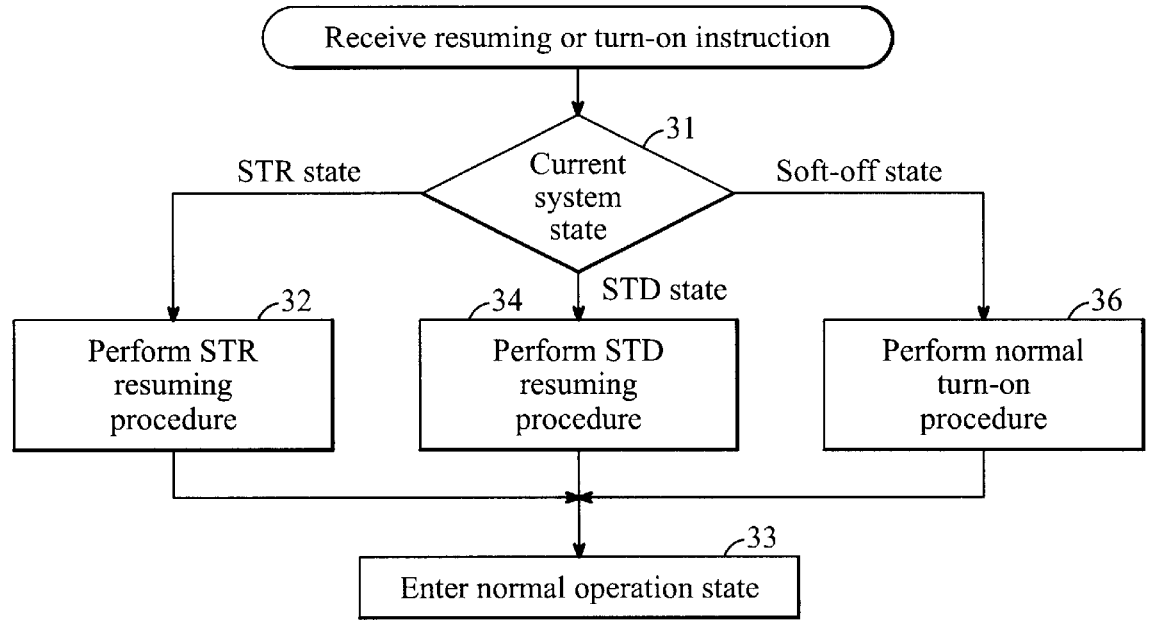
FIG. 3 is a flow chart showing a conventional computer system resuming to a normal operation state from a sleep state or soft-off state.

Reference will now be made in detail to the present preferred embodiments of the invention, examples of which are illustrated in the accompanying drawings. Wherever possible, the same reference numbers are used in the drawings and the description to refer to the same or like parts.

Figure 4:
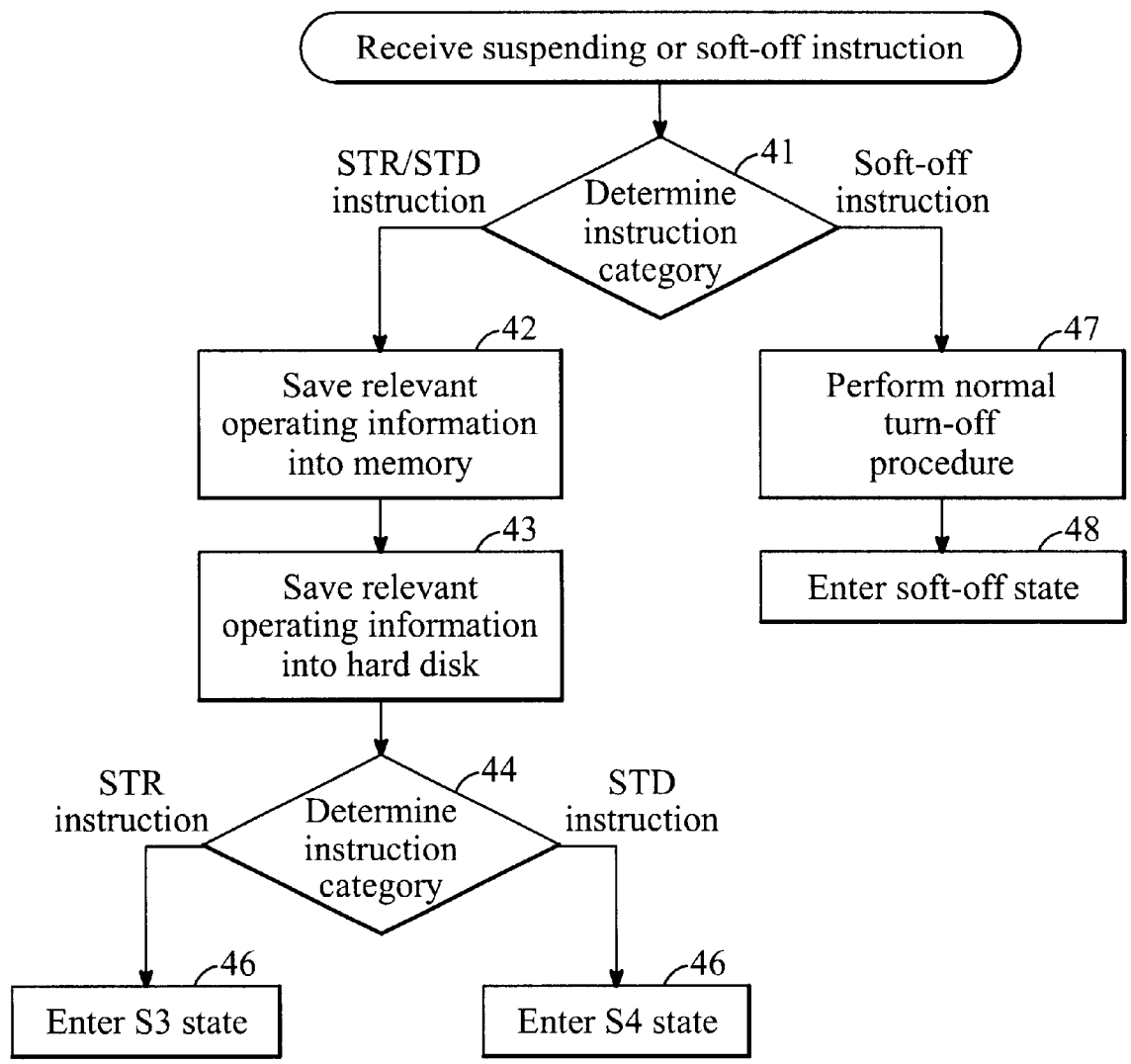
FIG. 4 is a flow chart showing a computer system entering into a sleep state or soft-off state according to a preferred embodiment of the present invention.
Figure 5:
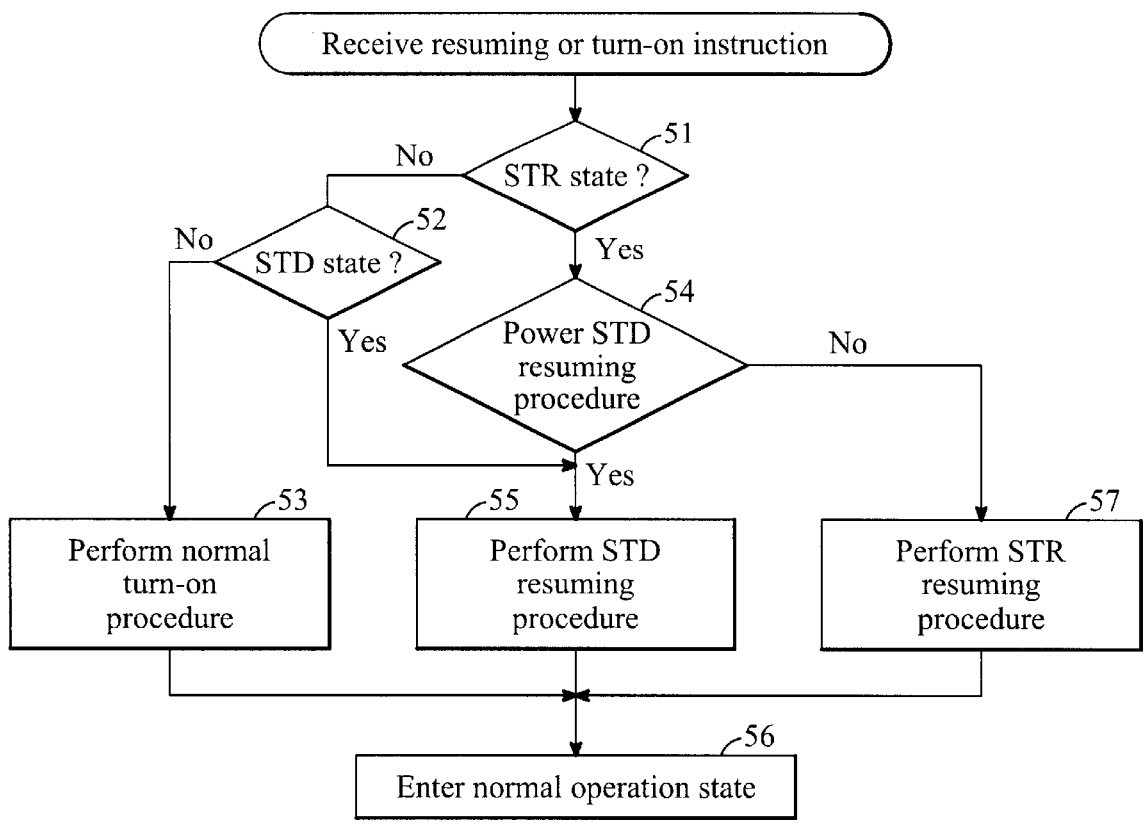
FIG. 5 is a flow chart showing a computer system resuming to a normal operation state from a sleep state or soft-off state according to a preferred embodiment of the present invention.
Figure 6:
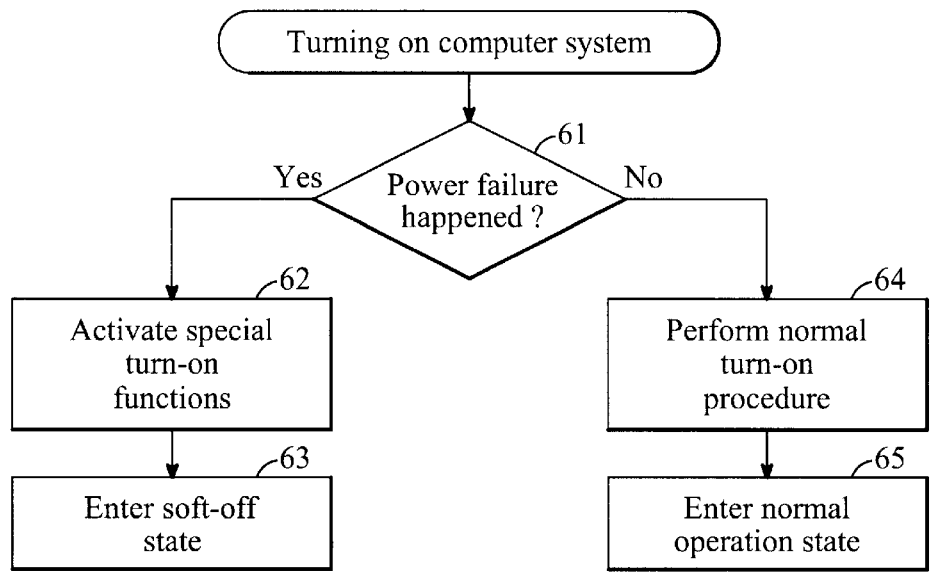
FIG. 6 is a flow chart showing a procedure for turning on a computer system according to a preferred embodiment of the present invention.

Refer to FIGS. 4 to 6, where flow charts of a method for suspending, resuming, and turning on a computer system without being affected by an abnormal power failure according to a preferred embodiment of the present invention are depicted. FIG. 4 is a flow chart showing a computer system entering into a sleep state or soft-off state. FIG. 5 is a flow chart showing a computer system resuming to a normal operation from a sleep state or soft-off state. FIG. 6 is a flow chart showing a procedure to turning on a computer system. These flow charts will be described in detail hereinafter.

Referring to FIG. 4, a flow chart showing procedures to suspend and turn off a computer system is depicted. When a suspending or soft-off instruction is received, the computer system follows procedures to suspend or turn off the system.

When the computer system receives an instruction, a decision is made to determine whether the instruction is a STR, STD, or soft-off instruction (Step 41). If the instruction received is determined as either a STR or STD instruction, relevant operating information and context of related devices are first saved into a memory in the computer system (Step 42), and subsequently, saved into a hard disk in the computer system (Step 43). When the relevant operating information and context of related devices are saved both into the memory and the hard disk in the computer system, whether the received instruction is a STR or a STD instruction is determined (Step 44). If the received instruction is a STR instruction, the computer system enters into the S3 sleep state (Step 45) by turning off the main power while maintaining the standby power to provide power required by the memory and its related circuits to store the relevant operating information in the memory. If the received instruction is a STD instruction, the computer system enters into the S4 sleep state (Step 46) by turning off the main power. If the received instruction in Step 41 is a soft-off instruction, a normal turn-off procedure is performed (Step 47) to close all the application programs and turn off the main power. The computer system enters a soft-off state (Step 48).

Refer to FIG. 5, a flow chart showing a computer system resuming to a normal operation state from a sleep state or soft-off state is depicted. When a resuming or turning-on instruction is received, the computer system follows procedures to resume or turn on the system to a normal operation state.

When the computer system receives a resuming or turn-on instruction, a decision is made to determine if the computer system is in the STR sleep state (Step 51). If the computer system is not in the STR sleep state, the computer system is further determined if it is in the STD sleep state (Step 52).

If the computer system is neither in the STR sleep state nor in the STD sleep state, a normal turn-on procedure is performed (Step 53) to turn on the computer system. The computer system enters the normal operation state (Step 56).

If the computer system is determined to be in the STD sleep state in Step 52, a STD resuming procedure is performed (Step 55) by fetching the relevant operating information from the hard disk to restore the system. The computer system enters the normal operation state (Step 56).

If the computer system is determined to be in the STR sleep state in Step 51, a decision is made to determine if an abnormal power failure happened to the computer system (Step 54). If the computer system is in the STR sleep state and an abnormal power failure had occurred, a STD resuming procedure is performed (Step 55) by fetching the relevant operating information from the hard disk to restore the system. The computer system enters into a normal operation state (Step 56). If the computer system is in the STR sleep state and no abnormal power failure had occurred, a STR resuming procedure is performed (Step 57) by fetching the relevant operating information and context of related devices from a memory to restore the system. The computer system enters into a normal operation state (Step 56).

According to the method for suspending and resuming a computer system, the relevant operating information and context of related devices are saved into a hard disk for both the STR and STD instructions. If an abnormal power failure happens when the computer system is in the S3 sleep state, the information saved in the memory will be lost. However, the relevant operating information before entering the sleep state can still be fetched from the hard disk to restore the system. If an abnormal power failure did not happen, relevant operating information can be fetched directly from the memory to swiftly restore the computer system to a normal operation state.

Referring to FIG. 6, a flow chart showing a procedure for turning on a computer system according to a preferred embodiment of the present invention is depicted. When a computer system is turned on, different turn-on procedures are performed depending on whether an abnormal power failure occurred or not.

First of all, whether an abnormal power failure happened is determined (Step 61). If an abnormal power failure happened to computer system, special turn-on functions, for example, a "wake on LAN" function and a "ring in wake up" function, are activated (Step 62). The computer system enters into a soft-off state (Step 63).

If no abnormal power failure happened to computer system, a normal turn-on procedure is performed (Step 64) to enter the computer system into a normal operation state (Step 65).

In addition, an "AC power failure restart" option in the basic input and output system (BIOS) setup menu is included so that users can select to restart the system or keep the previous state after power resumes if an AC power failure had happened. If no AC power failure happened, the "AC power failure restart" option has no effect and the system will boot directly to the OS according to a normal booting sequence. If an AC power failure did happen, the system starts up according to the "AC power failure restart" option in the BIOS setup menu. If the information saved in the register is "restart" or "keep the previous status" and the previous status is "ON", the system will boot directly to the OS. If the information saved in the register is "no restart required" or "keep the previous status" and the previous status is "OFF", the system will activate the "Wake on LAN" and "Ring in wake up" functions in the chipset and related devices to enter the system into the soft off state.

Figure 7:
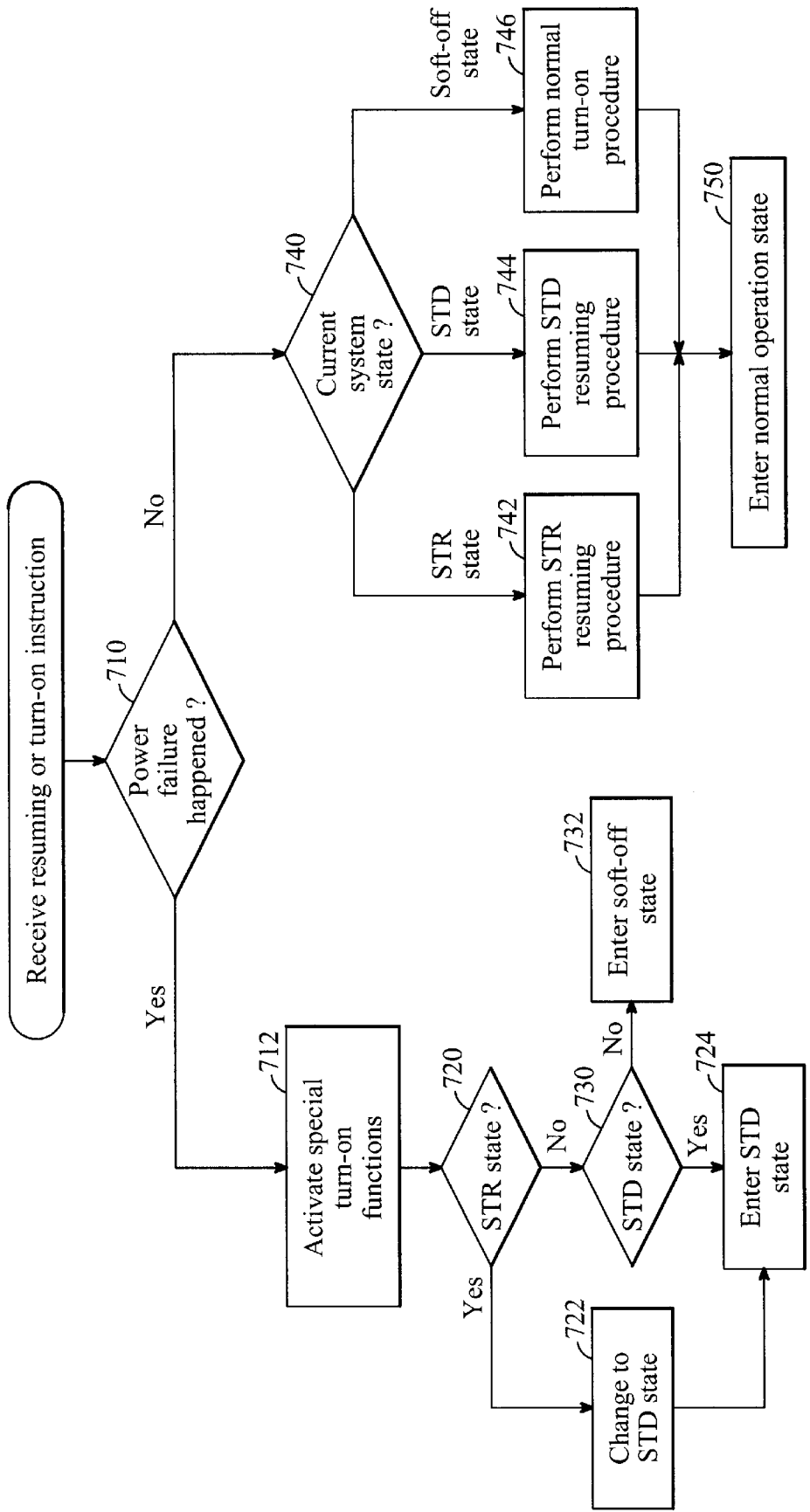
FIG. 7 is an integrated flow chart for both FIGS. 5 and 6 showing procedures to turn on and resume a computer system.

Integrating the procedures to turn on and resume a computer system mentioned earlier, it is understood that appropriate actions can be taken depending on whether the computer system is turned on in a normal way or it is resumed after a power failure. As shown in FIG. 7, an integrated flow chart for both FIGS. 5 and 6 showing procedures to turn on and resume a computer system is depicted.

When a resuming or turn-on instruction is received, the computer system determines whether any abnormal power failure had happened (Step 710). If an abnormal power failure happened to the computer system, a "wake on LAN" function and a "ring in wake up" function are activated (Step 712). The current state of the computer system is then determined (Step 720). If the computer system is in the STR sleep state and an abnormal power failure had occurred, the current state of the computer system is changed into the STD sleep state (Step 722), because the abnormal power failure will cause data loss in the memory. The computer system enters into the STD sleep state (Step 724), in which the computer system can fetch the relevant operating information from a hard disk when a resuming instruction is received next time. If the computer system is not in the STR sleep state, the system further determines whether it is in the STD sleep state (Step 730). If the computer system is in the STD sleep state, it enters into the STD sleep state (Step 724), waiting for a resuming instruction to wake up the computer system. If the computer system is not in the STD sleep state, the computer system enters into the soft-off state (Step 732).

When no abnormal power failure occurred is found in Step 710, the current state of the computer system is determined (Step 740). If the computer system is in the STR sleep state determined in Step 740, a STR resuming procedure is performed (Step 742), by fetching relevant operating information and context of related devices from a memory to restore the computer system to its original state before entering to the sleep state. Subsequently, the computer system enters a normal operation state (Step 750).

If the computer system is in the STD sleep state determined in Step 740, a STD resuming procedure is performed (Step 744) by fetching relevant operating information and context of related devices from the hard disk to restore the computer system to its original state before entering to the sleep state. Subsequently, the computer system enters a normal operation state (Step 750).

If the computer system is in the soft-off state determined in Step 740, a normal turn-on procedure is performed (Step 746) to enter the computer system to a normal operation state (Step 750).

From the above-mentioned description, it will be understood that the computer system first diagnoses whether any abnormal power failure happened. If an abnormal power failure did happen, the special turn-on functions are activated. Furthermore, if the current state is STR, it is then changed to the STD state so that the computer system enters the STD sleep state. When system resumes, relevant operating information of the computer system can be fetched from the hard disk to restore the computer system to its original operating state. If no abnormal power failure happened, a normal turn-on procedure is performed to turn on the computer system.

Compared with conventional methods, the method for suspending, resuming, and turning on a computer system according to the preferred embodiment of the present invention has the following advantages:

1. Before entering into the STR or STD sleep state, the computer system stores the relevant operating information and context of related devices into a hard disk. If an abnormal power failure occurs when the computer system is in the S3 or STR sleep state and the information stored in the memory is lost, the computer system can still fetch the stored information from the hard disk to restore the system to its original state without being affected by the abnormal power failure.

2. An "AC power failure restart" option in the BIOS setup menu is provided so that users can select to restart the system or keep the previous state after power resumes if an AC power failure had happened. If the information saved in the option is "no restart required" or "keep the previous status" and the previous status is "OFF", when power resumes after AC power loss, the system will automatically turn-on and activate the "Wake on LAN" and "Ring in wake up" functions in the chipset and related devices to enter the system into the soft off state after power resumes. System administrator or users can wake up the system from a remote side in a very convenient way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for suspending a computer system without being affected by a power failure, the method comprising the steps of:

receiving an instruction;

determining the instruction category;

performing a normal turn-off procedure so that the computer system enters a soft-off state if the instruction received is a soft-off instruction;

saving relevant operating information and context of related devices into a memory in the computer system if the instruction received is a suspend to RAM (STR) or a suspend to disk (STD) instruction;

saving relevant operating information and context of related devices into a hard disk in the computer system if the instruction received is a suspend to RAM (STR) or a suspend to disk (STD) instruction;

re-determining the instruction category;

entering the computer system into an STR sleep state if the instruction received in the step of re-determining the instruction category is the STR instruction; and entering the computer system into an STD sleep state if the instruction received in the step of re-determining the instruction category is the STD instruction.

2. The method of claim 1, wherein the memory in which the relevant operating information and context of related devices are saved is a volatile memory.

3. A method for resuming a computer system without being affected by a power failure, the method comprising the steps of:

receiving a wake up instruction, which comprises a resuming instruction or a turn-on instruction;

determining a current state of the computer system;

performing a normal turn-on procedure to enter the computer system into a normal operation state if the current state of the computer system is neither in a suspend to RAM (STR) sleep state nor in a suspend to disk (STD) sleep state;

performing an STD resuming procedure by restoring relevant operating information and context of related devices from a hard disk to the computer system so that the computer system enters into a normal operation state if the computer system is in the STD sleep state;

determining if a power failure happened when the computer system was in the STR sleep state;

performing the STD resuming procedure by restoring the relevant operating information and context of related devices from the hard disk to the computer system so that the computer system enters into a normal operation state if the computer system is in the STR sleep state and an abnormal power failure had occurred; and performing an STR resuming procedure by restoring the relevant operating information and context of related devices from a memory to the computer system so that the computer system enters into a normal operation state if the computer system is in the STR sleep state and no power failure had occurred.

4. The method of claim 3, wherein the memory is a volatile memory.

5. A method for suspending a computer system without being affected by a power failure, the method comprising the steps of:

receiving an instruction, wherein the instruction is selected from either one of a suspend to RAM (STR) instruction and a suspend to disk (STD) instruction;

saving relevant operating information and context of related devices into a memory in the computer system;

saving relevant operating information and context of related devices into a hard disk in the computer system;

determining the instruction category;

entering the computer system into an STR sleep state if the instruction received is the STR instruction; and entering the computer system into an STD sleep state if the instruction received is the STD instruction.

6. The method of claim 5, wherein the memory in which the relevant operating information and context of related devices are saved is a volatile memory.

7. The method of claim 5, wherein the memory is a volatile memory.

8. The method of claim 5, wherein the steps of saving are conducted before the step of determining the instruction category.

9. A method for resuming a computer system without being affected by a power failure, the method comprising the steps of:

receiving a wake up instruction, which comprises a resuming instruction or a turn-on instruction;

determining if a power failure happened when the computer system was in a suspend to RAM (STR) sleep state;

performing a STD resuming procedure by restoring relevant operating information and context of related devices from a hard disk to the computer system so that the computer system enters into a normal operation state if a power failure had occurred; and performing a STR resuming procedure by restoring relevant operating information and context of related devices from a memory to the computer system so that the computer system enters into a normal operation state if no power failure had happened.

10. A method for turning on a computer system without being affected by a power failure, the method comprising the steps of:

receiving a wake-up instruction, which comprises a resuming instruction or a turn-on instruction;

determining if a power failure happened to the computer system;

activating a "wake on LAN" function and a "ring in wake up" function if a power failure happened to the computer system;

determining a current state of the computer system;

changing the current state of the computer system into a suspend to disk (STD) sleep state if the computer system is in a suspend to RAM (STR) sleep state and a power failure had happened to the computer system;

entering the computer system into the STD sleep state;

entering the computer system into the STD sleep state if the computer system is in the STD sleep state and a power failure had happened to the computer system;

entering the computer system into a soft-off sleep state if the computer system is neither in the STR sleep state nor in the STD sleep state and a power failure had happened to the computer system;

determining a current state of the computer system if no power failure had happened to computer system;

performing an STR resuming procedure if the computer system is in the STR sleep state and no power failure happened to computer system;

performing an STD resuming procedure if the computer system is in the STD sleep state and no power failure happened to computer system; and performing a normal turn-on procedure if the computer system is in the soft-off sleep state and no power failure happened to computer system.

11. The method of claim 10, wherein the computer system enters a normal operation state after the STR resuming procedure is performed.

12. The method of claim 10, wherein the computer system enters a normal operation state after the STD resuming procedure is performed.

13. The method of claim 10, wherein the computer system enters a normal operation state after the normal turn-on procedure is performed.

* * * * *